US012571622B2

(12) United States Patent (10) Patent No.: US 12,571,622 B2
Yasuno (45) Date of Patent: Mar. 10, 2026

(54) ROUNDNESS MEASURING MACHINE

(71) Applicant: MITUTOYO CORPORATION,
Kanagawa (JP)

(72) Inventor: Junsuke Yasuno, Kanagawa (JP)

(73) Assignee: MITUTOYO CORPORATION,
Kanagawa (JP)

( * ) Notice: Subject to any disclaimer, the term of this
patent is extended or adjusted under 35
U.S.C. 154(b) by 711 days.

(21) Appl. No.: 17/872,778

(22) Filed: Jul. 25, 2022

(65) Prior Publication Data

US 2023/0032119 A1 Feb. 2, 2023

(30) Foreign Application Priority Data

Jul. 27, 2021 (JP) ................................. 2021-122697

(51) Int. Cl.
*G01B 5/20* (2006.01)
(52) U.S. Cl.
CPC ..................................... *G01B 5/201* (2013.01)
(58) Field of Classification Search
CPC .......... G01B 5/008; G01B 5/20; G01B 5/201;
G01M 11/025; G01M 11/008
USPC ........................................................ 33/503
See application file for complete search history.

(56) References Cited

U.S. PATENT DOCUMENTS 3,217,418 A * 11/1965 Wennerberg ........... B25H 7/005
33/832

4,369,581 A * 1/1983 Lenz ......................... G01B 5/25
33/701
5,694,339 A * 12/1997 Ishitoya ............... G05B 19/401
702/167

(Continued)

FOREIGN PATENT DOCUMENTS

EP 2253928 A1 * 11/2010 ........... G01B 21/047
JP 4163545 B2 10/2008

(Continued)

OTHER PUBLICATIONS

Office Action issued in Corresponding JP Patent Application No.
2021-122697, dated Feb. 25, 2025, along with an English transla-
tion thereof.

(Continued)

*Primary Examiner* — Yaritza Guadalupe-Mccall
(74) *Attorney, Agent, or Firm* — Greenblum & Bernstein,
P.L.C.

(57) ABSTRACT

A roundness measuring machine includes: a turntable on
which a workpiece is to be placed; a displacement detector
detecting a displacement of a stylus; a column provided on
a base shared with the turntable; a Z-axis slider supported by
the column and movable in a Z-axis direction extending
vertically; an X-axis slider supported by the Z-axis slider
and movable in an X-axis direction intersecting the Z-axis
direction; and an attitude adjusting mechanism provided to
the X-axis slider and supporting the displacement detector
such that an attitude of the displacement detector is adjust-
able. The attitude adjusting mechanism includes: a Y-axis
slider supported by the X-axis slider and movable in a Y-axis
direction intersecting the Z-axis and the X-axis directions;
and a detector holder supported by the Y-axis slider and
supporting the displacement detector such that the displace-
ment detector is turnable around the X-axis direction.

5 Claims, 6 Drawing Sheets

(56)     References Cited

U.S. PATENT DOCUMENTS

| | | | | |
|---|---|---|---|---|
| 6,886,264 | B2 | 5/2005 | Sakata et al. | |
| 7,636,646 | B2 * | 12/2009 | Kojima | G01B 5/201 |
| | | | | 702/167 |
| 8,302,322 | B2 | 11/2012 | Yasuno et al. | |
| 8,336,223 | B2 * | 12/2012 | Nakayama | G01B 5/201 |
| | | | | 33/553 |
| 9,952,045 | B2 * | 4/2018 | Yasuno | G01B 21/042 |
| 10,514,244 | B2 | 12/2019 | Nakayama et al. | |
| 11,193,762 | B2 | 12/2021 | Sakai et al. | |
| 11,435,175 | B2 * | 9/2022 | Morii | G01B 21/045 |
| 2015/0300798 | A1 * | 10/2015 | Pettersson | G05B 19/401 |
| | | | | 33/503 |
| 2016/0084631 | A1 * | 3/2016 | Nakayama | G01B 5/201 |
| | | | | 33/550 |
| 2016/0161239 | A1 * | 6/2016 | Takanashi | G01B 5/0014 |
| | | | | 33/551 |
| 2018/0058836 | A1 * | 3/2018 | Nakayama | G01B 5/201 |
| 2023/0032119 | A1 * | 2/2023 | Yasuno | G01B 5/201 |

FOREIGN PATENT DOCUMENTS

| | | | | |
|---|---|---|---|---|
| JP | 2010-266413 | | 11/2010 | |
| JP | 2011-127952 | | 6/2011 | |
| JP | 5451180 | B2 | 3/2014 | |
| JP | 2016-65751 | | 4/2016 | |
| JP | 5971445 | B1 * | 8/2016 | |
| JP | 2016148685 | A * | 8/2016 | |
| JP | 2019-190864 | | 10/2019 | |
| WO | WO-2016121490 | A1 * | 8/2016 | G01B 5/285 |

OTHER PUBLICATIONS

Office Action issued in Corresponding JP Patent Application No. 2021-122697, dated Aug. 19, 2025, along with an English translation thereof.

* cited by examiner

F I G . 3
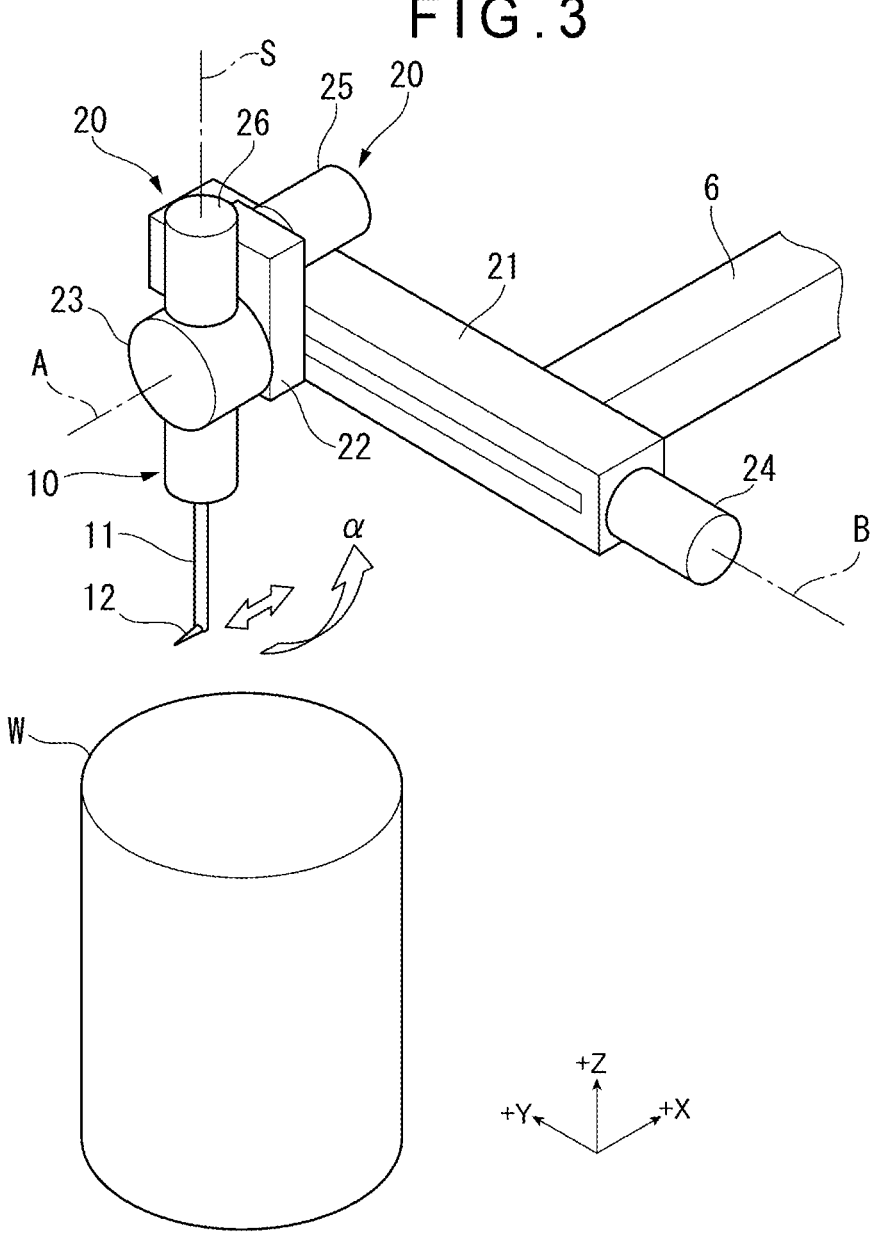

ROUNDNESS MEASURING MACHINE

The entire disclosure of Japanese Patent Application No. 2021-122697 filed Jul. 27, 2021 is expressly incorporated by reference herein.

TECHNICAL FIELD

The present invention relates to a roundness measuring machine.

BACKGROUND ART

A roundness measuring machine is usable to measure a roundness of a workpiece (an object) in the form of a rotating body.

The roundness measuring machine includes a turntable on which a workpiece is to be placed, a displacement detector that detects a displacement of a stylus at a distal end by using a swingable arm, and a motion mechanism that moves the displacement detector to bring the stylus into contact with a surface of the workpiece. The roundness measuring machine detects the roundness or the like of the workpiece by scanning the surface of the rotating workpiece using the stylus.

The motion mechanism includes a column provided on a base shared with the turntable, a lifting slider supported by the column and movable in an up-down direction (a Z-axis direction), and a horizontal arm supported by the lifting slider and movable in a horizontal direction (an X-axis direction). The displacement detector is attached to a distal end of the horizontal arm.

The stylus can thus be brought into contact with a desired position on the surface of the workpiece through the movement of the displacement detector in the X-axis direction and in the Z-axis direction caused by the motion mechanism.

The roundness measuring machine also includes an additional attitude adjusting mechanism provided between the horizontal arm and the displacement detector (see Patent Literature 1: JP 4163545 B and Patent Literature 2: JP 5451180 B).

In order to perform calibration of an origin position through measurement of a reference sphere, a roundness measuring machine of Patent Literature 1 includes not only a column and a first horizontal arm with which a displacement detector is movable in an X-axis direction and a Z-axis direction, but also a rotary member and a second horizontal arm rotatable around the X-axis at a distal end of the first horizontal arm. The displacement detector is supported rotatably around the Z-axis at a distal end of the second horizontal arm.

Rotating the rotary member around the X-axis enables an extension direction of the displacement detector and a swing arm thereof to be changed by 180 degrees around the first horizontal arm (the X-axis direction). Further, a rotation of the displacement detector enables an orientation of the stylus to be changed by 180 degrees around the swing arm (basically the Z-axis direction but changeable with rotation around the X-axis).

In such a roundness measuring machine of Patent Literature 1, the displacement detector is capable of rotating around the X-axis and the Z-axis in addition to basic motions in the X-axis direction and the Z-axis direction in order to measure a variety of spots on a workpiece. This makes it possible for the displacement detector to contact anywhere in a spherical surface of the reference sphere from a desired direction.

A roundness measuring machine of Patent Literature 2 includes not only a column and a slide arm with which a displacement detector is movable in an X-axis direction and a Z-axis direction, but also a second slide mechanism at a distal end of the slide arm. The second slide mechanism is used for a stylus automatic replacement between the detector and a stylus storage provided beside the column. The second slide mechanism enables the displacement detector to move in an extension direction of a swing arm thereof (the Z-axis direction during a measurement operation). A turning drive mechanism provided to the slide arm enables the second slide mechanism and the stylus to rotate around the X-axis in increments of ±90 degrees.

In such a roundness measuring machine of Patent Literature 2, in addition to basic motions in an X-axis direction and a Z-axis direction, the stylus of the displacement detector extending in the Z-axis direction in a measurement state can be rotated by the turning drive mechanism to have a horizontal state (to be set in a Y-axis direction intersecting the Z-axis and the X-axis). Then, the stylus is translated by the second slide mechanism to perform the stylus automatic replacement between the detector and the stylus storage.

In the above-described roundness measuring machine of Patent Literature 1, the stylus is caused to rotate around the X-axis and the Z-axis to perform calibration using a reference sphere, whereby a highly accurate measurement operation is achieved. However, a measurement result may be erroneous if a contact position of the stylus is out of a diameter position of the workpiece in measurement.

Specifically, in a typical roundness measurement, a stylus is brought into contact with a surface of a workpiece at a maximum position at the positive side in the X-axis direction within a horizontal cross section (circle), which is taken at a freely-selected position in the Z-axis direction of the workpiece. A displacement at the position is detected with a rotation of the workpiece. Here, the stylus may be offset in the Y-axis direction relative to the maximum position at the positive side in the X-axis direction of the workpiece. In this case, the detected displacement includes an error, for example, a detection value may be smaller than an actual displacement at the maximum position. In order to solve this problem, a typical roundness measuring machine has a function to manually or automatically adjust an offset in the Y-axis direction.

In the above-described roundness measuring machine of Patent Literature 2, the stylus having a horizontal attitude for the stylus replacement can move in the Y-axis direction, which is used to eliminate the error due to an offset in the Y-axis direction. However, in the roundness measuring machine of Patent Literature 2, the motion of the stylus in the Y-axis direction is intended for the stylus automatic replacement. Thus, a fine motion for error prevention is not taken into consideration and such an application is difficult in practice. Further, the stylus in the roundness measuring machine of Patent Literature 2 is set in the Y-axis direction in a stylus automatic replacement mode. In an original measurement attitude of the stylus (in a case where the stylus is directed toward the Z-axis direction), although the stylus is movable in the Z-axis direction, the stylus is not movable in the Y-axis direction. The application for elimination of an offset in measurement is thus not possible.

SUMMARY OF THE INVENTION

An object of the invention is to provide a roundness measuring machine capable of eliminating an offset in a Y-axis direction between a workpiece and a stylus even in a measurement operation.

A roundness measuring machine according to an aspect of the invention includes: a turntable on which a workpiece is to be placed; a displacement detector configured to detect a displacement of a stylus at a distal end of a swing arm; a column provided on a base shared with the turntable; a Z-axis slider that is supported by the column and is movable in a Z-axis direction extending vertically; an X-axis slider that is supported by the Z-axis slider and is movable in an X-axis direction intersecting the Z-axis direction; and an attitude adjusting mechanism that is provided to the X-axis slider and supports the displacement detector such that an attitude of the displacement detector is adjustable, the attitude adjusting mechanism including: a Y-axis slider that is supported by the X-axis slider and is movable in a Y-axis direction intersecting the Z-axis direction and the X-axis direction; and a detector holder that is supported by the Y-axis slider and supports the displacement detector such that the displacement detector is turnable around the X-axis direction.

In such an aspect of the invention, the column, the Z-axis slider, and the X-axis slider provide the motion mechanism and the roundness or the like of the workpiece can be measured by bringing the stylus of the displacement detector into contact with the surface of the workpiece on the turntable.

For the measurement, the attitude of the displacement detector may be adjusted by the attitude adjusting mechanism, causing the stylus to have an attitude along an up-down direction (Z-axis direction). This measurement state is similar to that of a typical roundness measuring machine.

Turning the displacement detector around the X-axis direction by 90 degrees by the attitude adjusting mechanism allows the stylus to be horizontal along the Y-axis direction. An intermediate angle thereof is also achievable. An upper surface of the workpiece can be measured by bringing the stylus having a horizontal attitude into contact with the upper surface of the workpiece.

In measurement, the detector holder and the displacement detector (including a part of the attitude adjusting mechanism between the detector holder and the displacement detector) can be displaced in the Y-axis direction by the Y-axis slider, making it possible for the stylus to come into contact with an appropriate position on the surface of the workpiece. The Y-axis slider of the aspect of the invention can adjust a position in the Y-axis direction at any time irrespective of the above-described turning attitude of the displacement detector provided by the detector holder. The Y-axis slider can eliminate an offset in the Y-axis direction between the workpiece and the stylus even in a measurement operation.

In the roundness measuring machine according to the aspect of the invention, it is preferable that the detector holder supports the displacement detector such that the displacement detector is rotatable around an extension direction of the swing arm.

In such an aspect of the invention, an orientation of the stylus at the distal end of the swing arm can be changed by rotating the displacement detector around the extension direction of the swing arm.

For instance, in a case where the attitude of the displacement detector is in the up-down direction as in a typical roundness measuring machine, the stylus is suitably brought into contact with a side surface of the workpiece in different directions by changing the orientation of the stylus.

In a case where the attitude of the displacement detector is in the horizontal direction, scanning measurement of the upper surface of the workpiece is suitably performed by directing the stylus downward.

In the roundness measuring machine according to the aspect of the invention, it is preferable that the attitude adjusting mechanism includes: a Y-axis arm that is fixed to the X-axis slider and extends in the Y-axis direction; and the Y-axis slider movable along the Y-axis arm.

In such an aspect of the invention, a motion direction of the Y-axis slider can be accurately maintained by virtue of the Y-axis arm fixed to the X-axis slider.

According to the aspect of the invention, it is possible to provide a roundness measuring machine capable of eliminating an offset in a Y-axis direction between a workpiece and a stylus even in a measurement operation.

BRIEF DESCRIPTION OF DRAWINGS

FIG. 3 is a perspective view illustrating a Y-axis motion of the attitude adjusting mechanism of the exemplary embodiment;

DESCRIPTION OF EMBODIMENT(S)

An exemplary embodiment of the invention will be described with reference to the drawings.

Figure 1:
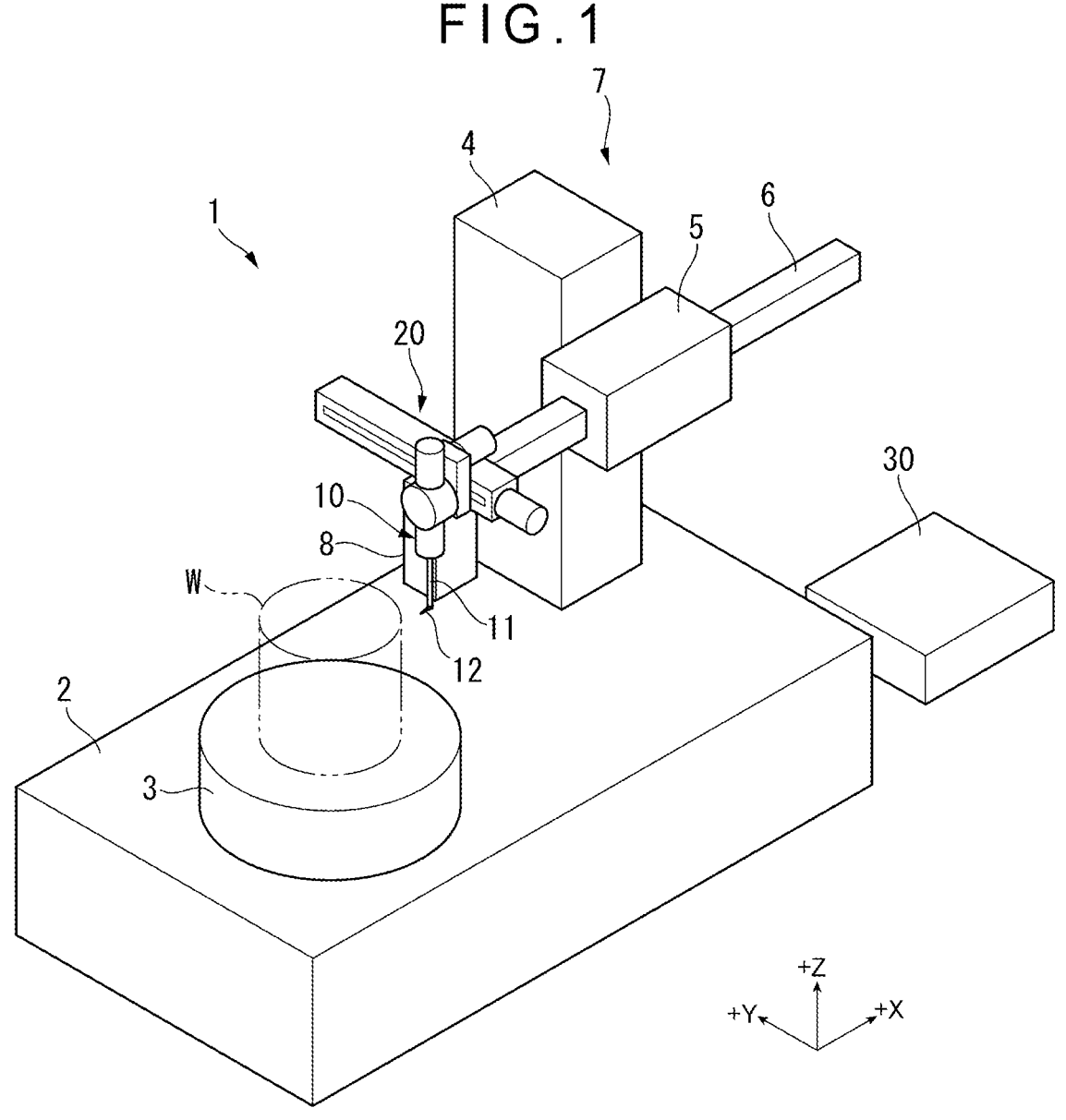
FIG. 1 is a perspective view illustrating an exemplary embodiment of a roundness measuring machine of the invention.

In FIG. 1, a roundness measuring machine 1 includes a turntable 3 on an upper surface of a base 2 and a workpiece W, which is a measurement target, is to be placed on an upper surface of the turntable 3.

The turntable 3 is rotatable by a drive motor (not illustrated) provided in the base 2.

A column 4 is provided on the upper surface of the base 2. A Z-axis slider 5 is supported on a side surface of the column 4. The Z-axis slider 5 supports an X-axis slider 6 in the form of a horizontal arm.

The Z-axis slider 5 is movable in a vertical Z-axis direction by a lifting mechanism (not illustrated) provided in the column 4.

The X-axis slider 6 is movable in a horizontal X-axis direction by a drive mechanism (not illustrated) provided in the Z-axis slider 5.

The column 4, the Z-axis slider 5, and the X-axis slider 6 provide a motion mechanism 7, enabling a displacement detector 10, which is attached to a distal end of the X-axis slider 6, to move to a desired position.

Figure 2:
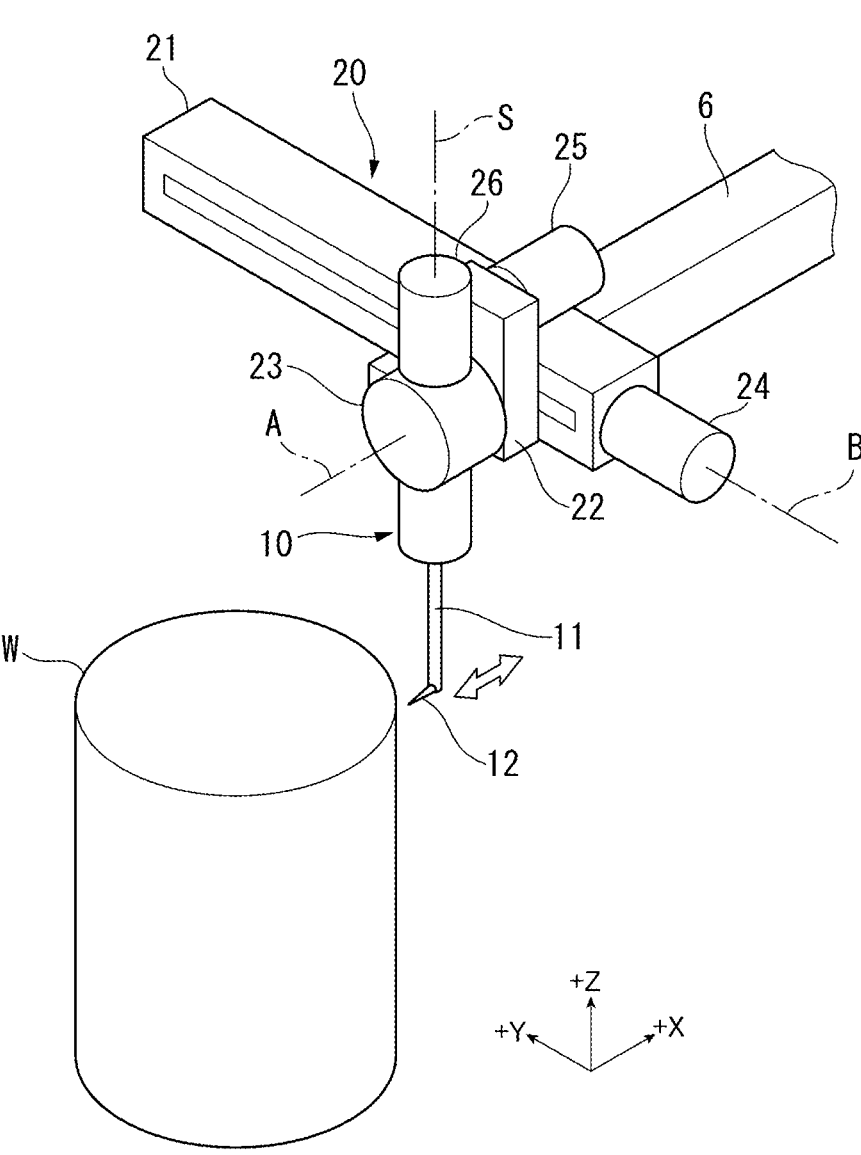
FIG. 2 is a perspective view illustrating a vertical exterior-surface measurement attitude of an attitude adjusting mechanism of the exemplary embodiment.

As illustrated also in FIG. 2, an arm 11 (a swing arm) for measurement, which is swingably supported by the displacement detector 10, has a distal end forming a stylus 12 that can be brought into contact with the workpiece W.

There are provided, inside the displacement detector 10, a means of applying a contact force and a scale (not illustrated) that detects a displacement of the stylus 12 from a swing angle of the arm 11, the contact force biasing the arm 11 in a swinging direction so that the stylus 12 is in contact with a surface of the workpiece W with a predetermined contact force occurring between the stylus 12 and the surface of the workpiece W.

An attitude adjusting mechanism 20 is provided between the displacement detector 10 and the distal end of the X-axis slider 6.

The attitude adjusting mechanism 20 includes a Y-axis arm 21 fixed to the distal end of the X-axis slider 6, a Y-axis slider 22 supported by the Y-axis arm 21, and a detector holder 23 supported by the Y-axis slider 22.

The Y-axis arm 21, which is in the form of a box-shaped arm extending along an axial line B parallel with a Y-axis, has a side surface on which the Y-axis slider 22 is supported. The Y-axis arm 21 can guide the Y-axis slider 22 along the axial line B by virtue of a guide mechanism provided therein. A Y-axis drive motor 24 is provided at an end portion of the Y-axis arm 21 and the Y-axis drive motor 24 is connected to the Y-axis slider 22 via a feed drive mechanism inside the Y-axis arm 21. The Y-axis drive motor 24 thus enables the Y-axis slider 22 to move to a desired position on the Y-axis arm 21 along the axial line B.

The Y-axis slider 22 supports the detector holder 23 such that the detector holder 23 is rotatable around an axial line A parallel with an X-axis. The Y-axis slider 22, which is provided with an a-axis drive motor 25, can rotate the detector holder 23 around the axial line A via a transmission mechanism (not illustrated).

The detector holder 23 supports the displacement detector 10 in a direction of extension of the arm 11 (referred to as an axial line S) such that the displacement detector 10 is rotatable. The detector holder 23, which is provided with a β-axis drive motor 26, can rotate the displacement detector 10 around the extension direction of the arm 11 (the axial line S) via a transmission mechanism not illustrated.

Referring back to FIG. 1, the roundness measuring machine 1 is connected to a control device 30 that controls the above-described motion mechanism 7, attitude adjusting mechanism 20, and displacement detector 10.

The control device 30 is configured to execute a predetermined operation program to control the roundness measuring machine 1. The motion of the displacement detector 10 caused by the motion mechanism 7, adjustment of the attitude of the displacement detector 10 caused by the attitude adjusting mechanism 20, and a process of data detected by the displacement detector 10 are each performed with the assistance of the control device 30.

A stylus storage 8 is provided adjacent to the column 4 on the upper surface of the base 2. A plurality of distal end parts (including the styluses 12) of the arm 11, which are attachable to the displacement detector 10, are stored in the stylus storage 8.

The arm 11 of the displacement detector 10 can be automatically replaced by causing the displacement detector 10 to approach or move away from the stylus storage 8 under control of the control device 30.

In the roundness measuring machine 1 of the exemplary embodiment, a variety of measurement forms can be taken by adjusting the attitude of the displacement detector 10 as follows.

In FIG. 2 described above, the attitude adjusting mechanism 20 causes the displacement detector 10 to be near a Y-axis negative end portion (a position of connection between the Y-axis arm 21 and the X-axis slider 6). The displacement detector 10 is set such that the extension direction (the axial line S) of the arm 11 faces a Z-axis direction negative side (downward) and the stylus 12 is directed toward an X-axis negative direction (the opposite direction to the X-axis slider 6). In the exemplary embodiment, this attitude is referred to as "vertical exterior-surface measurement attitude."

In the vertical exterior-surface measurement attitude (see FIG. 2), the distal end of the arm 11 moves toward the workpiece W from a positive side in the X-axis direction through the movement of the displacement detector 10 caused by the motion mechanism 7, making it possible for the stylus 12 to be brought into contact with a circumferential surface of the workpiece W. Rotating the workpiece W with the stylus 12 being in contact therewith enables scanning measurement of a roundness of the circumferential surface of the workpiece W.

At this time, if a position where the stylus 12 is in contact with the circumferential surface of the workpiece W is offset in the Y-axis direction relative to a maximum position at the positive-side in the X-axis direction of the workpiece W, an accurate contour or roundness of the workpiece W cannot be detected.

Such an offset is detectable from a reference dimension or the like of the workpiece W by the control device 30. In a case where an offset is detected, the control device 30 controls the attitude adjusting mechanism 20 to cause the Y-axis slider 22 to slightly move in the Y-axis direction along the Y-axis arm 21. The offset is thus eliminated.

The Y-axis slider 22 is caused to further move in the Y-axis direction from the vertical exterior-surface measurement attitude, which provides a state in FIG. 3.

In FIG. 3, the displacement detector 10 is supported near a Y-axis positive end portion of the Y-axis arm 21 with the extension direction (the axial line S) of the arm 11 aligned with the Z-axis direction.

Figure 4:
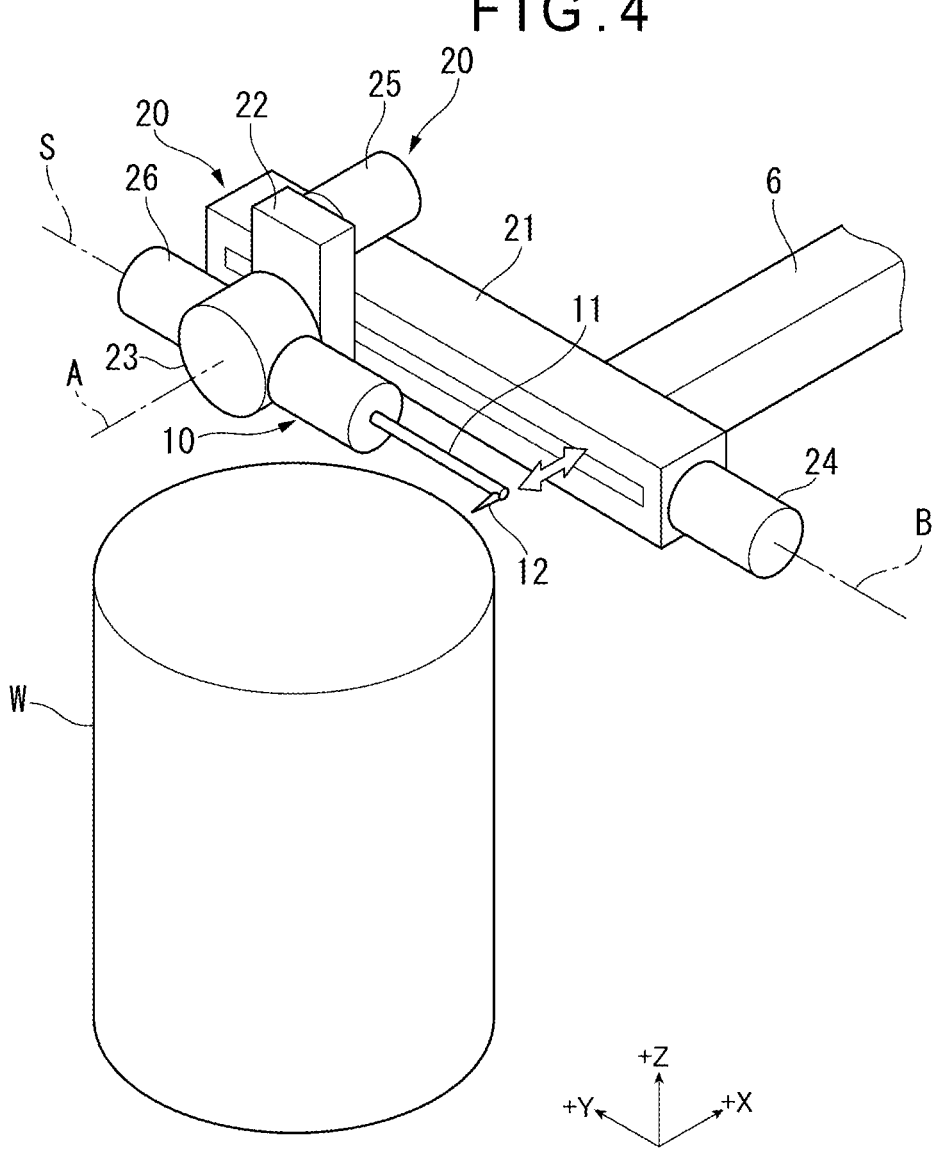
FIG. 4 is a perspective view illustrating a horizontal exterior-surface measurement attitude of the attitude adjusting mechanism of the exemplary embodiment.

The displacement detector 10 is caused to rotate around the axial line A by 90 degrees from this state by the a-axis drive motor 25 (see an arrow α), which provides a state in FIG. 4.

In the displacement detector 10 of FIG. 4, the distal end of the arm 11 is directed toward a Y-axis negative direction and the extension direction (the axial line S) of the arm 11 is horizontal along the Y-axis direction. At this time, the stylus 12 remains directed toward the X-axis negative direction. In the exemplary embodiment, this attitude corresponds to a "horizontal exterior-surface measurement attitude."

Likewise, in the horizontal exterior-surface measurement attitude (see FIG. 4), the distal end of the arm 11 moves toward the workpiece W from the positive side in the X-axis direction through the movement of the displacement detector 10 caused by the motion mechanism 7, making it possible for the stylus 12 to be brought into contact with the circumferential surface of the workpiece W. Rotating the workpiece W with the stylus 12 being in contact therewith enables scanning measurement of a roundness of the circumferential surface of the workpiece W.

In a case where a position where the stylus 12 is in contact with the circumferential surface of the workpiece W is offset in the Y-axis direction, the Y-axis slider 22 is slightly moved in the Y-axis direction along the Y-axis arm 21. The offset is thus eliminated.

Figure 5:
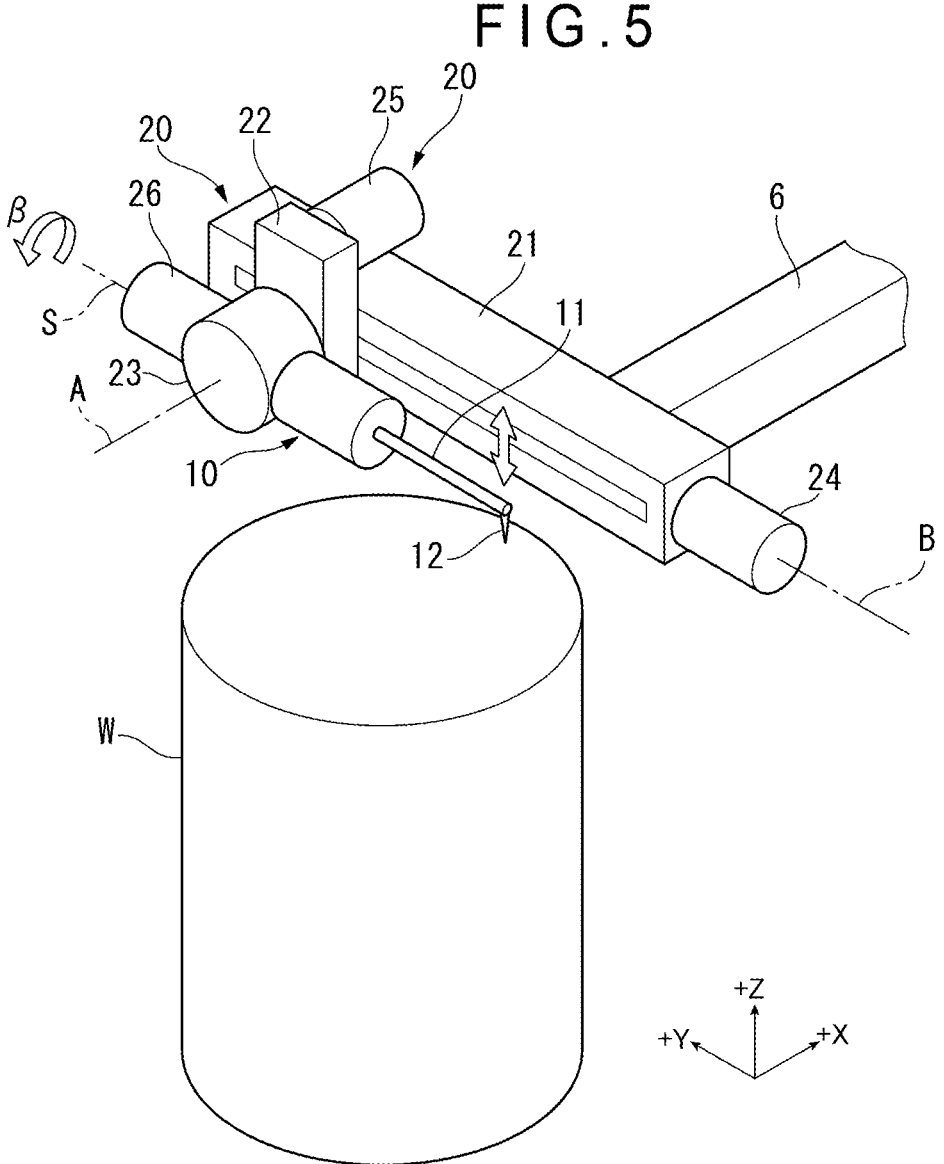
FIG. 5 is a perspective view illustrating a horizontal upper/lower-surface measurement attitude of the attitude adjusting mechanism of the exemplary embodiment.

The displacement detector 10 is caused to rotate around the axial line S from the horizontal exterior-surface measurement attitude by the detector holder 23 and the β-axis drive motor 26, which provides a state in FIG. 5.

In the displacement detector 10 of FIG. 5, the arm 11 is directed toward the Y-axis negative direction. A rotation of the displacement detector 10 (see an arrow β) changes an orientation of the stylus 12 from the X-axis negative direction to a Z-axis negative direction (downward). In the exemplary embodiment, this attitude corresponds to a "horizontal upper/lower-surface measurement attitude."

In the horizontal upper/lower-surface measurement attitude (see FIG. 5), the distal end of the arm 11 moves toward the workpiece W from above the workpiece W (from a positive side in the Z-axis direction) through the movement of the displacement detector 10 caused by the motion mechanism 7, making it possible for the stylus 12 to come into contact with a desired radial position on an upper surface of the workpiece W. Rotating the workpiece W with the stylus 12 being in contact therewith enables scanning measurement of a flatness at the desired radial position on the upper surface of the workpiece W.

The workpiece W may be supported by hanging instead of being placed on the turntable 3. In that case, rotating the workpiece W causes the stylus 12 to be brought into contact with a lower surface of the workpiece W, which enables scanning measurement of a flatness of the lower surface.

Also in the measurement of the upper/lower surface of the workpiece W, an offset of the stylus 12 in the Y-axis direction relative to the workpiece W can be eliminated by slightly moving the Y-axis slider 22 in the Y-axis direction along the Y-axis arm 21.

Figure 6:
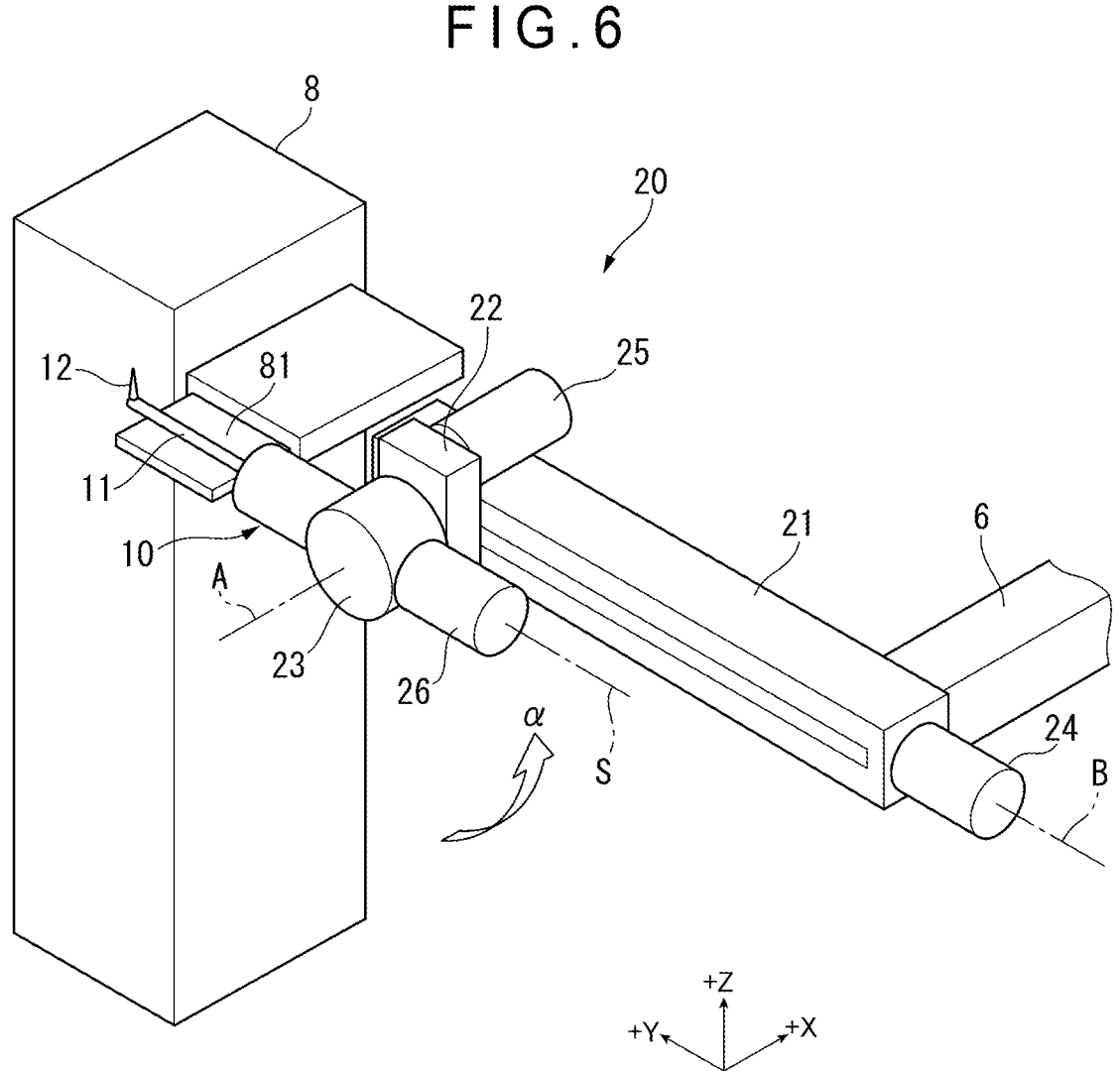
FIG. 6 is a perspective view illustrating a stylus replacement attitude of the attitude adjusting mechanism of the exemplary embodiment.

The displacement detector 10 is caused to rotate around the axial line A by 180 degrees from the horizontal upper/lower-surface measurement attitude by the α-axis drive motor 25 (see an arrow α in FIG. 6), which provides a state in FIG. 6.

In the displacement detector 10 of FIG. 6, the distal end of the arm 11 is directed toward a Y-axis positive direction and the extension direction (the axial line S) of the arm 11 is horizontal along the Y-axis direction. In the exemplary embodiment, this attitude corresponds to a "stylus replacement attitude."

In the stylus replacement attitude, when the Y-axis slider 22 is at a limit of motion in the Y-axis positive direction of the Y-axis arm 21, a distal end portion of the arm 11 (a removable part including the stylus 12) of the displacement detector 10 is placed on an arm support part 81 of the stylus storage 8. Moving the Y-axis slider 22 in the Y-axis negative direction with the distal end portion of the arm 11 being clamped on the arm support part 81 allows the currently attached distal end portion of the arm 11 to be transferred to the stylus storage 8. A new distal end portion of the arm 11 to be attached next is taken out of the stylus storage 8 and the Y-axis slider 22 is again moved in the Y-axis positive direction. The new distal end portion of the arm 11 is thus attached to the displacement detector 10. A stylus automatic replacement operation can be performed in the above manner.

The exemplary embodiment can achieve the following effects.

In the roundness measuring machine 1 of the exemplary embodiment, the column 4, the Z-axis slider 5, and the X-axis slider 6 form the motion mechanism 7, and the roundness or the like of the workpiece W can be measured by bringing the stylus 12 of the displacement detector 10 into contact with a surface of the workpiece W on the turntable 3.

For the measurement, the attitude of the displacement detector 10 may be adjusted by the attitude adjusting mechanism 20, causing the stylus 12 to have an attitude (the vertical exterior-surface measurement attitude) along an up-down direction (the Z-axis direction). This measurement state is similar to that of a typical roundness measuring machine.

Turning the displacement detector 10 around the X-axis direction by 90 degrees by the attitude adjusting mechanism 20 allows the stylus 12 to be horizontal along the Y-axis direction (the horizontal exterior-surface measurement attitude). The displacement detector 10 may be in a slanted attitude with the axial line S of the arm 11 being at an intermediate angle such as 45 degrees.

In the roundness measuring machine 1 of the exemplary embodiment, the detector holder 23 supports the displacement detector 10 such that the displacement detector 10 is rotatable around the extension direction (the axial line S) of the arm 11. The orientation of the stylus 12 at the distal end of the arm 11 can thus be changed by rotating the displacement detector 10.

For instance, in a case where the attitude of the displacement detector 10 is in the up-down direction (the vertical exterior-surface measurement attitude) as in a typical roundness measuring machine, the stylus 12 can be brought into contact with a side surface of the workpiece W in different directions by changing the orientation of the stylus 12. Such a contact of the stylus 12 from all circumferential directions is useful for a calibration operation on a reference sphere.

In a case where the attitude of the displacement detector 10 is in the horizontal direction (the horizontal exterior-surface measurement attitude), scanning measurement of the upper surface of the workpiece W can be performed by directing the stylus 12 downward.

In the measurement using the roundness measuring machine 1 of the exemplary embodiment, the Y-axis slider 22 can displace the detector holder 23 and the displacement detector 10 (including a part of the attitude adjusting mechanism 20 between the detector holder 23 and the displacement detector 10) in the Y-axis direction. The stylus 12 can thus be brought into contact with an appropriate position on the surface of the workpiece W.

The Y-axis slider 22 can adjust a position in the Y-axis direction at any time irrespective of the above-described turning attitude of the displacement detector 10 provided by the detector holder 23. The Y-axis slider 22 can eliminate an offset in the Y-axis direction between the workpiece W and the stylus 12 even in a measurement operation.

The attitude adjusting mechanism 20 of the exemplary embodiment includes the Y-axis arm 21 fixed to the X-axis slider 6 and extending in the Y-axis direction and the Y-axis slider 22 movable along the Y-axis arm 21. A motion direction of the Y-axis slider 22 can be accurately maintained by virtue of the Y-axis arm 21 fixed to the X-axis slider 6.

The invention is not limited to the above-described exemplary embodiment and modifications and the like are within the scope of the invention as long as an object of the invention is achievable.

In the above-described exemplary embodiment, the arm 11 having the distal end provided with the stylus 12 protruding in an intersecting direction is used. The invention, however, is not limited thereto. For instance, an arm having a distal end provided with a spherical contact tip may be used. This arrangement eliminates the necessity of changing the orientation of the arm 11 using the detector holder 23 and the β-axis drive motor 26. When the arm 11 having the distal end provided with the stylus 12 protruding in the intersecting direction is used, measurement for the upper and lower surfaces of the workpiece W may not be required. In this case also, the function of changing the orientation of the arm 11 using the detector holder 23 and the β-axis drive motor 26 may be omitted.

In the above-described exemplary embodiment, the stylus storage 8 is provided for the roundness measuring machine 1 to perform the automatic replacement of the stylus 12 (the distal end portion of the arm 11). This function, however, is not indispensable for the invention and may be omitted, as appropriate.

In the above-described exemplary embodiment, the attitude adjusting mechanism 20 includes the Y-axis arm 21 fixed to the X-axis slider 6 and extending in the Y-axis direction and the Y-axis slider 22 movable along the Y-axis arm 21. The invention, however, is not limited thereto. The Y-axis arm 21 and the Y-axis slider 22 may be integrally formed so that the Y-axis arm 21 is movably supported in the Y-axis direction at the distal end of the X-axis slider 6.

What is claimed is:

1. A roundness measuring machine comprising:
a turntable on which a workpiece is to be placed;
a displacement detector configured to detect a displacement of a stylus at a distal end of a swing arm;
a column provided on a base shared with the turntable;
a Z-axis slider that is supported by the column and is movable in a Z-axis direction extending vertically;
an X-axis slider that is supported by the Z-axis slider and is movable relative to the Z-axis slider in an X-axis direction intersecting the Z-axis direction; and
an attitude adjusting mechanism that is provided to the X-axis slider and supports the displacement detector such that an attitude of the displacement detector is adjustable, the attitude adjusting mechanism comprising:

a Y-axis slider that is supported by the X-axis slider and is movable in a Y-axis direction intersecting the Z-axis direction and the X-axis direction, the Y-axis slider being configured to be driven by a Y-axis drive motor; and
a detector holder that is supported by the Y-axis slider and supports the displacement detector such that the displacement detector is turnable around the X-axis direction.

2. The roundness measuring machine according to claim 1, wherein the detector holder supports the displacement detector such that the displacement detector is rotatable around an extension direction of the swing arm.

3. The roundness measuring machine according to claim 1, wherein the attitude adjusting mechanism comprises:
a Y-axis arm that is fixed to the X-axis slider and extends in the Y-axis direction; and
the Y-axis slider movable along the Y-axis arm.

4. The roundness measuring machine according to claim 3, wherein the Y-axis drive motor is configured to move the Y-axis slider in the Y-axis direction during measurement of a roundness of the workpiece.

5. The roundness measuring machine according to claim 1, wherein
the swing arm includes a plurality of swing arms,
a stylus storage is provided adjacent to the column on an upper surface of the base to store the plurality of swing arms, and
the swing arm of the displacement detector is automatically replaced by causing the displacement detector to approach or move away from the stylus storage.

* * * * *